(No Model.)
E. W. FARNHAM.
DYNAMO ELECTRIC MACHINE.
No. 591,625.                              Patented Oct. 12, 1897.
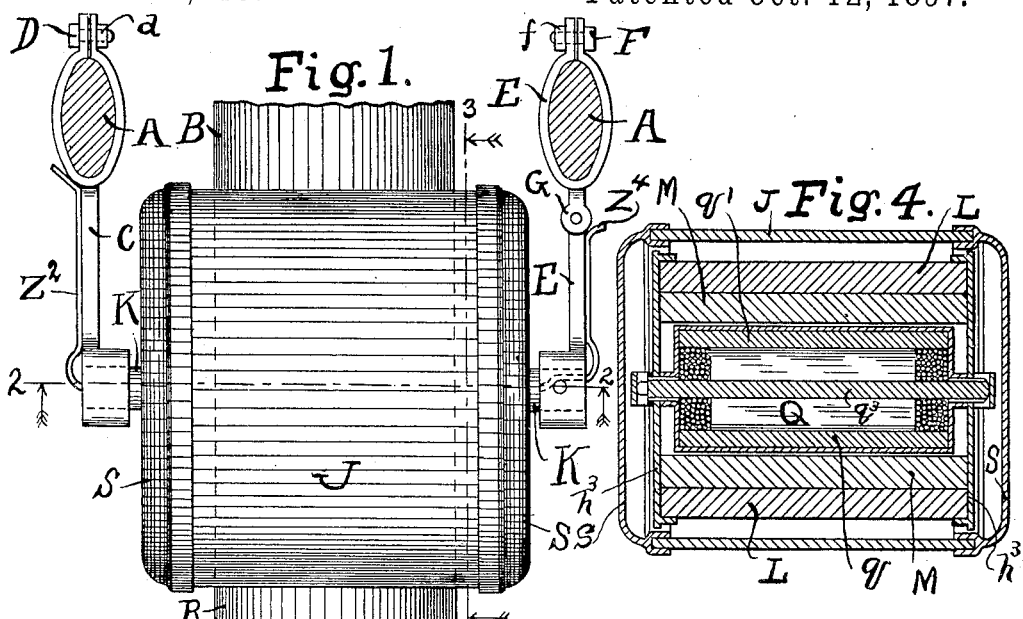
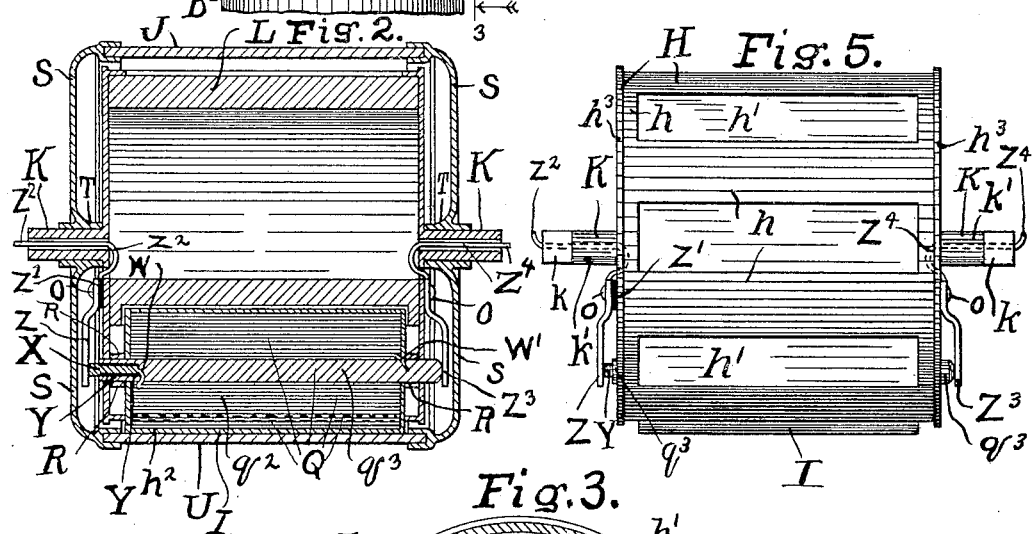
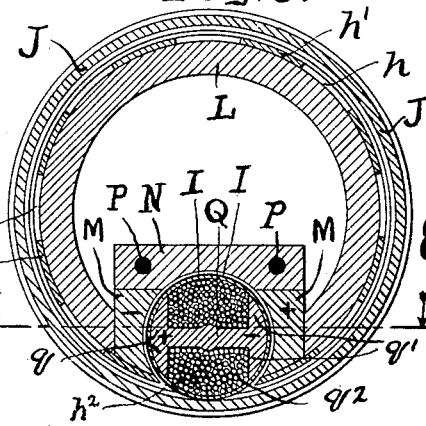
Witnesses:
Wm. F. Barnard
J. M. Crane
Inventor.
Edward W. Farnham,
By Brown & Brown,
Attys.

UNITED STATES PATENT OFFICE.

EDWARD W. FARNHAM, OF CHICAGO, ILLINOIS.

DYNAMO-ELECTRIC MACHINE.

SPECIFICATION forming part of Letters Patent No. 591,625, dated October 12, 1897.

Application filed July 19, 1897. Serial No. 645,023. (No model.)

*To all whom it may concern:*

Be it known that I, EDWARD WILSON FARNHAM, residing at Chicago, in the county of Cook and State of Illinois, have invented certain new and useful Improvements in Dynamos, of which the following, when taken in connection with the drawings accompanying and forming a part hereof, is a full and complete description, sufficient to enable those skilled in the art to understand and make the same.

This invention relates to dynamos wherein the field comprises a permanent magnet having cheek-pieces forming poles at the ends thereof and the armature comprises rotatably-mounted soft-iron cheek-pieces properly wound with wire, the strands whereof are properly insulated.

The object of this invention is to obtain a dynamo which may be attached to a vehicle, so as to be driven by one of the wheels of such vehicle.

In case the dynamo embodying this invention is driven by being adjusted to frictional contact with the tire of the vehicle to which it is attached it is subjected at times to considerable dust and other times to mud and moisture, such dust and mud being brought into contact therewith by the wheel driving it and with which it is in contact, particularly where the vehicle is a bicycle, and one of the principal objects sought by me is to obtain a dynamo wherein the working parts are protected from dust and mud, as are also the electrical connections of the dynamo, particularly those formed by means of brushes. It is also necessary in dynamos designed to be used with a bicycle or other vehicle for the generation of a current with which an electrical light shall be illumed or an electrical bell actuated that sufficient current for the purpose sought shall be generated when the bicycle or other vehicle is being driven at a moderate rate of speed, and I have therefore sought means whereby the required number of revolutions to the armature will be secured at all times when it is desirable to have a light illumed or an alarm given.

I have embodied my invention in a dynamo whereby an alternating current is obtained, as I believe that with such current an efficiency is secured in a dynamo of a given size and weight actuated as stated and for the purpose named greater than in one wherein a direct current is used; but as the arrangement of the parts forming a commutator or collector and the brushes thereof, with their relative position to the armature, forms no part of this invention all the essential features of the invention may be embodied in a dynamo producing a direct and not an alternating current.

In the drawings referred to, Figure 1 is a horizontal sectional view of the side pieces or tubes of the fork of a bicycle-frame and a top plan view of a dynamo embodying my invention and of a short section of a rubber tire of a bicycle-wheel. Fig. 2 is a vertical sectional view of the dynamo embodying my invention on line 2 2 of Fig. 1, viewed in the direction indicated by the arrows. Fig. 3 is a transverse vertical sectional view of the dynamo on line 3 3 of Fig. 1, viewed in the direction indicated by the arrows. Fig. 4 is a horizontal sectional view on line 4 4 of Fig. 3, viewed in the direction indicated by the arrows; and Fig. 5, an elevation of the stationary casing and shaft of the dynamo and showing the armature, the manner in which the armature is mounted in such stationary casing, and the commutator-brushes with their electrical connections.

A reference-letter applied to designate a given part is used to indicate such part throughout the several figures of the drawings wherever the same appears.

A are the perpendicular bars of the fork of a bicycle.

B is a portion of a bicycle-tire.

C is a bracket secured to one side of the bars A A, as by the bolt D, having nut $d$ thereon.

E is a hinged bracket secured to the other bar of the bicycle-fork, as by bolt F, having nut $f$ thereon.

G is the hinge of the hinged bracket E.

H is a stationary shell or casing consisting of cylinder $h$, which may well have the openings $h'$ $h'$ $h'$ therein to lighten it and which must have the opening $h^2$ therein, (see Fig. 3,) through which the armature-casing I extends to come into frictional contact with the inner peripheral surface of the rotatably-mounted cylinder J, to be hereinafter more fully described, and the ends $h^3$ $h^3$, having the projecting lugs K K thereon. Lugs K are squared at the ends $k$ $k$ thereof, and such squared ends fit into corresponding holes in the brackets C and E, respectively.

The particular construction of the brackets C and E form no essential part of the invention, and any adjustable bracket arranged to hold the shell H non-rotatably in position may be substituted for the brackets C and E illustrated and described.

L is a permanent magnet mounted in shell H and having the soft-iron cheek-pieces M M. Cheek-pieces M M are connected by the bar N, which may well be of aluminium.

The ends $h^3$ $h^3$ of the shell H may be secured to the bar N by screws O O, (see Figs. 2 and 5,) extending through the head $h^3$ and into the poles P P (see Fig. 3) to strengthen such shell H.

Q is the armature, consisting of the casing I, hereinbefore named, the soft-iron bars Q $q$, the winding-wire $q^2$, and shaft $q^3$. Shaft $q^3$ of the armature is rotatably mounted in bearings R R in the ends $h^3$ of shell H.

S S are disks having hubs T rotatably mounted on parts $k'$ of projection K, and J is a cylinder on the respective ends of which the disks S S are respectively secured, forming in connection with such disks a casing rotatably mounted on the projections K K. The brackets supporting the dyamo embodying my invention are so adjusted that the cylinder J of this casing is in frictional contact with the bicycle-tire B and rotated thereby.

The cylinder J is so mounted with reference to the cylinder I of the armature that such cylinder I is in frictional contact with the inner peripheral surface of the cylinder J, so that when such cylinder is rotated the armature of the dynamo is rotated thereby.

For convenience of reference in the further description of the dynamo embodying my invention I have marked one of the soft-iron poles of the armature Q with the minus sign and the other of such poles with the plus sign, (see Fig. 3,) such minus sign indicating that the condition of magnetic excitation at a given time of the pole-piece to which it is attached is negative, and the plus sign indicating that at such time the other pole-piece is positive. In the rotation of the armature Q when the soft-iron pole-pieces $q$ $q'$ have exchanged places the magnetic excitation thereof will have changed such pole-pieces therefor, alternately becoming negative and positive. The inner end of the winding-wire $q^2$ is electrically connected to the pin X, such pin being insulated from the shaft $q^3$ by insulating material Y.

Z is a brush secured to the end $h^3$ of the stationary casing H, and Z' is insulating material interposed between the brush Z and the end of such casing H.

$Z^2$ is a wire forming a part of the circuit extending through the projections K and electrically connected at its inner end to brush Z.

The outer end W' of the winding-wire $q^2$ is electrically connected to the shaft $q^3$ of the armature, and $Z^3$ is a brush in electrical contact with the shaft $q^3$.

$Z^4$ is a wire forming part of the circuit of the dynamo, such wire extending through one of the projections K and electrically connected at its inner end with the brush $Z^3$.

The bearings R R may be ball-bearings, if preferred, and in order to avoid the oiling of such bearing through the casing formed by cylinder J and disks S S such bearings are by me made ball-bearings.

The operation of the device is as follows: Upon the rotation of the bicycle or other vehicle wheel with which the cylinder J of the casing (formed by such cylinder J and disks S S) is in contact such casing will be rotated on the projections K K, and the rotation of such casing will cause the armature Q to be rotated, the cylinder I, which forms the casing of the armature, being in frictional contact with the inner peripheral surface of cylinder J. By the rotation of the armature Q the poles $q$ $q'$ thereof are alternately, negatively, and positively excited, and thereby an alternating current is generated in winding-wire thereof and delivered through brushes Z $Z^3$ onto the circuit whereof wires $Z^2$ $Z^4$ form a part, and a lamp or other electrical signal will be actuated.

The circuit and the lamp or other signal form no part of this invention, and the same are not fully illustrated or described.

Having thus described my invention, what I claim as new, and desire to secure by Letters Patent, is—

1. In a dynamo, the combination of a permanent C-shaped magnet, a frame in which the magnet is placed, an armature rotatably mounted in the end walls of the frame, a cylinder forming a casing to the armature, and an outer casing rotatably mounted on the ends of the frame with the inner peripheral surface of the cylinder forming part of the casing in frictional contact with the cylinder of the armature so that rotation of the outer casing produces rotation of the armature; substantially as described.

2. In a dynamo, the combination of a permanent C-shaped magnet, a frame in which the magnet is secured, an armature rotatably mounted in the end walls of the frame, a cylinder on the armature covering the winding-wire and the poles thereof, projections on the ends of the frame, standards in which such projections fit and are non-rotatably held, an outer casing rotatably mounted on the projections on the ends of the frame between such ends and the standards supporting the frame, and a connection between such outer casing and the vehicle on which the dynamo is mounted; substantially as described.

3. In a dynamo, the combination of a permanent C-shaped magnet, a frame in which the magnet is non-rotatably contained, an armature rotatably mounted in the end walls of the frame, a cylinder on the armature covering the winding-wires and the pole thereof, projections on the ends of the frame, a passage-way through one of such projections and wires extending through such passage-way to and electrically connected with the brushes of the armature, standards in which the projections on the ends of the frame fit and by which they are held, an outer casing rotatably mounted on the projections on the ends of the frame so that the inner peripheral wall thereof is in frictional contact with the cylinder on the armature, and a connection between the outer casing and the wheel of the vehicle on which the dynamo is mounted; substantially as described.

4. In a dynamo, the combination of a frame consisting of a cylinder, ends to the cylinder and projections on such ends forming in combination with the standard into which the projection fits the support of the frame, a permanent magnet in the frame soft-iron pole-pieces to the magnet a connection between the pole-pieces means for securing the pole-pieces to the ends of the frame, and an armature rotatably mounted in the ends of the frame in the field of the pole-pieces of the permanent magnet, and a cylinder surrounding such armature, whereby the armature may be rotated by frictional contact with the peripheral surface of a wheel; substantially as described.

5. In a dynamo the combination of a frame secured to a non-rotatable shaft, a standard in which the shaft is secured, a permanent magnet in the frame, soft-iron pole-pieces to the magnet, a connection between the pole-pieces, an armature rotatably mounted in the frame in the field of the pole-pieces of the permanent magnet, an outer casing consisting of a cylinder rotatably mounted on the non-rotatable shaft, and a connection between the rotatable casing and the armature, whereby the rotation of the casing produces rotation of the armature; substantially as described.

EDWARD W. FARNHAM.

Witnesses:
J. P. STREET,
D. B. MORISON.